United States Patent [19]

Hansen et al.

[11] Patent Number: 5,133,066

[45] Date of Patent: Jul. 21, 1992

[54] METHOD FOR SELECTING MULTIPLE VERSIONS OF DATA IN A REDUCED RECORD UNITS TEXT EDITING SYSTEM

[75] Inventors: Juanita J. Hansen; Dale A. Peterson; Erwin P. Simon; David G. Wenz, all of Rochester, Minn.

[73] Assignee: International Business Machines Corporation, Armonk, N.Y.

[21] Appl. No.: 405,097

[22] Filed: Sep. 8, 1989

Related U.S. Application Data

[63] Continuation of Ser. No. 221,000, Jul. 18, 1988, abandoned, which is a continuation of Ser. No. 790,703, Oct. 24, 1985, abandoned.

[51] Int. Cl.⁵ .................. G06F 12/02; G06F 15/40; G06F 15/413
[52] U.S. Cl. .................... 395/600; 364/280; 364/280.7; 364/281.3; 364/281.6; 364/281.7; 364/282.1; 364/282.3; 364/283.1; 364/283.2; 364/283.3; 364/283.4; 364/284.2; 364/DIG. 1
[58] Field of Search ... 364/200 MS File, 900 MS File

[56] References Cited

U.S. PATENT DOCUMENTS

| | | |
|---|---|---|
| 4,425,618 | 1/1984 | Bishop et al. ............ 364/200 |
| 4,503,488 | 3/1985 | Mason et al. ............ 364/200 |
| 4,507,751 | 3/1985 | Gawlick et al. ......... 364/900 |
| 4,633,384 | 12/1986 | Kusumi .................... 364/900 |
| 4,633,430 | 12/1986 | Cooper .................... 364/900 |
| 4,635,189 | 1/1987 | Kendall .................... 364/300 |
| 4,641,274 | 2/1987 | Swank ....................... 364/900 |
| 4,674,043 | 6/1987 | Hernandez et al. .... 364/900 |

OTHER PUBLICATIONS

Crus et al., "Incremental Data Base Log Image Copy", IBM TDB vol. 25, No. 7B, Dec. 1982, pp. 3730-3732.
Dey et al., "Method for Dropping Data Sets", IBM TDB vol. 25, No. 11A, Apr. 1983, pp. 5453-5455.

Primary Examiner—Thomas C. Lee
Assistant Examiner—Daniel Pan
Attorney, Agent, or Firm—J. Michael Anglin

[57] ABSTRACT

A text document is stored as a sequence of primary records linked by a table. When an operator changes one of the records, the changed text is stored as a secondary record associated with a primary record in the table. If the operator later chooses to undo the changes, the secondary records are deleted. If he chooses to keep the changes, the secondary records are substituted for the associated primary records, and the latter are deleted.

8 Claims, 5 Drawing Sheets

METHOD FOR SELECTING MULTIPLE VERSIONS OF DATA IN A REDUCED RECORD UNITS TEXT EDITING SYSTEM

This is a continuation of co-pending application Ser. No. 07/221,000 filed on Jul. 8, 1988, now abandoned, which is a continuation of co-pending application Ser. No. 06/790,703 filed on Oct. 24, 1985, now abandoned.

BACKGROUND OF THE INVENTION

This invention relates to electronic data processing, and more particularly concerns a method for reducing the amount of time and temporary storage space required for large data files while they are being modified.

The invention is useful in conjunction with editors, word processors, data-base managers, and similar programs which manipulate and modify large collections of data. Editors will be used to exemplify such programs, and the data will be termed a text document.

Editors come in two types, for the present purpose. One type loads a copy of the document from disk or main storage into a separate work file. The editor actually modifies only the data in the work file. At the end of a session, the operator may keep the changes in the new version by replacing the original file with the work file; or, he may choose to exit without update by discarding the work file. The latter is useful as an "undo" capability. Also, a power failure, a rogue global replace, or some other calamity only destroys the changes, not the original document. On the other hand, this type of editor doubles the storage space required for the document, and requires a significant amount of time to construct and store the work file. The second type of editor makes modifications directly to the data file containing the original document. They are smaller and faster, but they live dangerously; a malfunction or operator mistake could destroy the entire data file. Most word processors are of the second type, since they usually run in smaller machines with less storage and slower processors.

SUMMARY OF THE INVENTION

Although the data files for such programs may be quite large, the modifications during a single session are normally relatively small. Much of the data in a work file remains an exact duplicate of the corresponding data in the original file.

The present invention achieves higher speed and less storage space but retains full back-out capability, by breaking the data into smaller units, and duplicating only those units in which changes actually occur. The original or primary units are linked together by an index table. Whenever data from a unit is modified, it is stored in a secondary unit. The index table associates this secondary unit with the proper primary unit. At the end of the session—or when disaster strikes—a number of such secondary units may have been created. The operator then has a choice of saving his modifications (or continuing an interrupted session), or of backing out and discarding the changes (or starting over from an interruption).

That is, both the original version and the modified version of the data have been saved, yet at far less cost than with conventional work files. This is transparent to the user, since the system merely substitutes the secondaries for the primaries for the first choice, or discards the secondaries for the second.

The foregoing and other aspects of the invention, as well as modifications obvious to those skilled in the art, will become apparent from the following description of a preferred embodiment.

DESCRIPTION OF A PREFERRED EMBODIMENT

The specific implementation to be described is incorporated in the publicly available IBM "DisplayWrite/36" word-processing program product, to which reference is made for all conventional aspects. This product runs on the IBM System/36 data-processing system, which has a central processor for storing and manipulating data for multiple concurrent tasks, and a number of disks, workstation controllers (WSCs), and other input/output devices interconnected by a channel. Each WSC has its own processor, and connects to a number of workstations by a multi-drop cable. Each workstation has a display screen and a keyboard for an individual user or operator.

Figure 1:
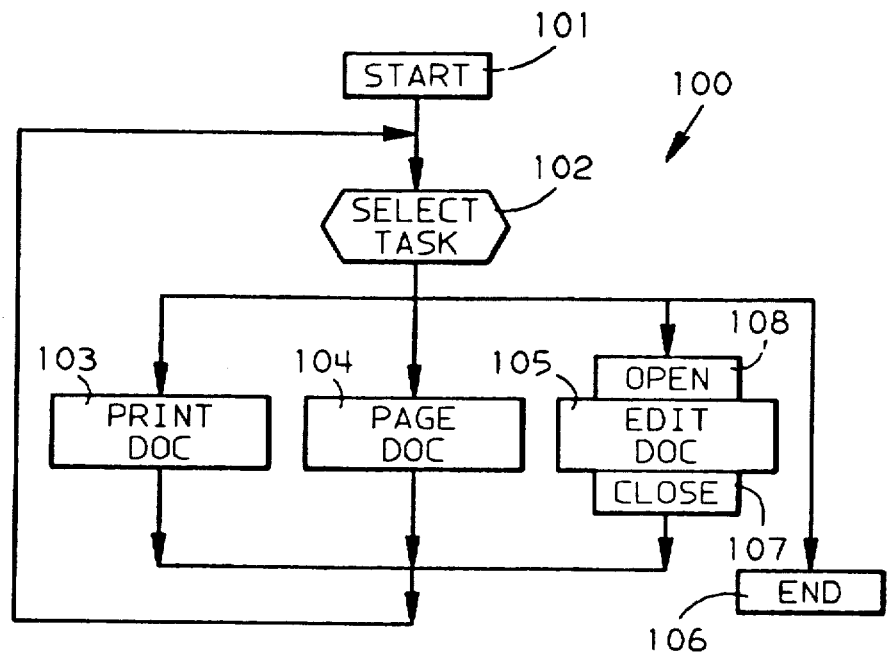
FIG. 1 is a high-level flowchart of a word processor in which the invention finds utility.

FIG. 1 is a high-level flowchart showing some of the major tasks of word processor (WP) 100. After an initialization at block 101, block 102 presents a menu of tasks which the operator can select. Blocks 103 and 104, for example, print and paginate a document designated by the operator. Block 105 performs the main editing tasks on a document. Block 106 exits the WP program. Tasks 103-105 must open a document for processing and must close it upon completion of the task. Blocks 107 close an open document in a conventional manner, except as noted in FIG. 7. Block 108 opens a user-specified document conventionally, except as noted in FIG. 8.

Figure 2:
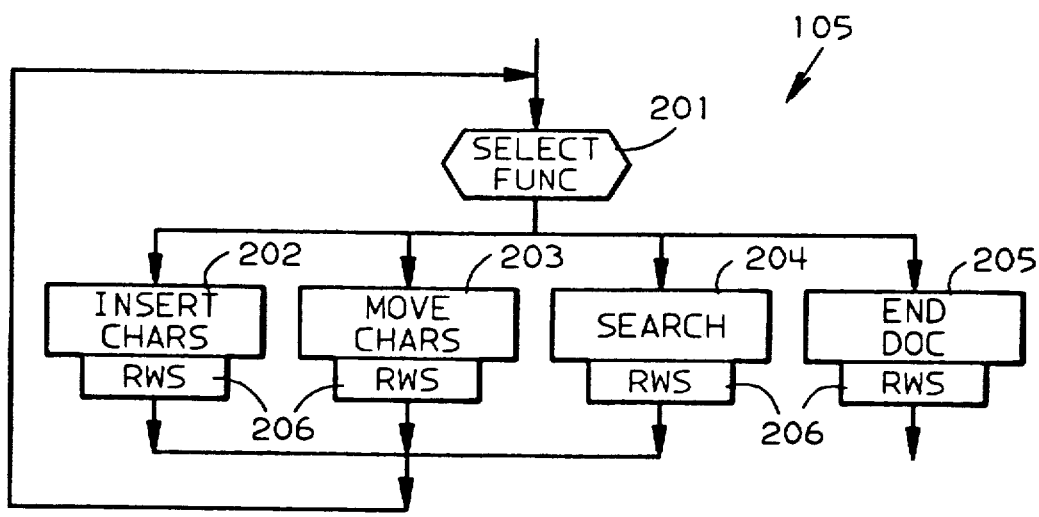
FIG. 2 is a flowchart of the Edit function of FIG. 1.

FIG. 2 shows a few of the functions of the editing task 105, FIG. 1. After the user has specified the name of the document to be edited, and has set or changed the format and other parameters, block 201 selects a function in response to the user's keystrokes. Block 202 inserts characters into the document when the user presses alphanumeric keys on the keyboard. Blocks 203 and 204 respond to function keys for conventional functions such as moving blocks of characters to a different place and searching for occurrences of designated characters in the text. Block 205 ends the editing task in response to an "End Document" key.

Figure 4:
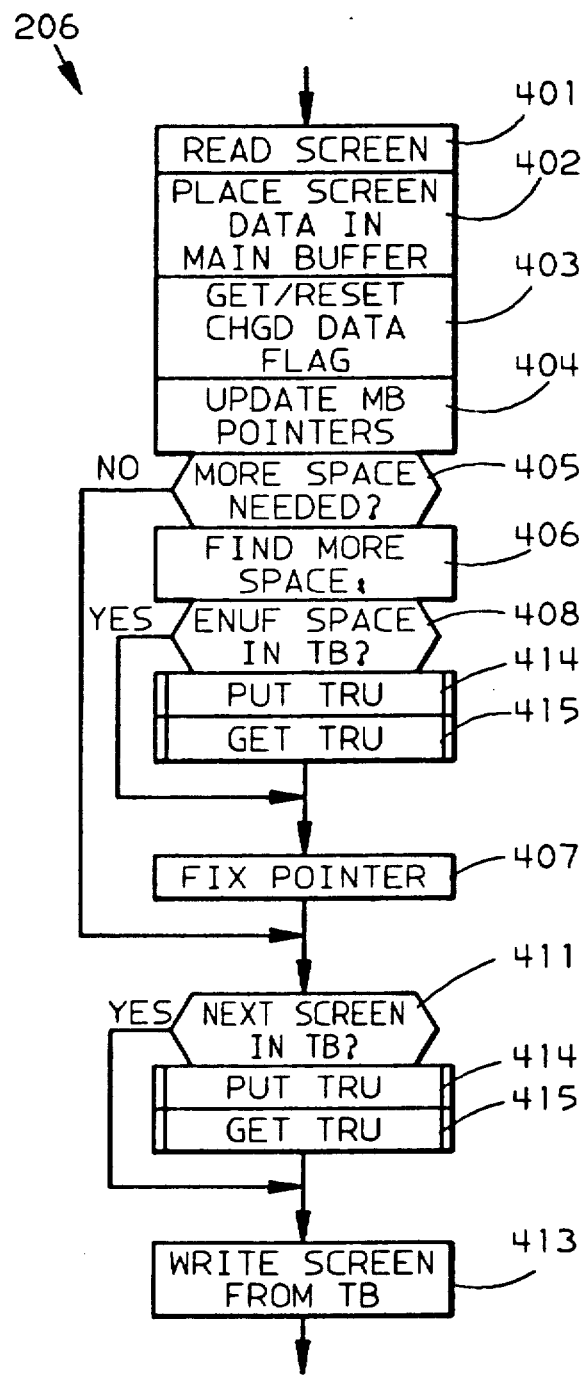
FIG. 4 is a flowchart of a method for processing text record units (TRUs) according to the invention.

In this implementation, a "Read/Write Screen" (RWS) routine 206 reads the current screenful of characters back to the central processor and writes a new screenful from the central processor, whenever the user requests an operation that requires the display of document text (or a menu, help text, etc.) not presently on the screen. This routine performs many conventional functions, and also carries out a part of the invention, as shown in FIG. 4. The invention could, however, be implemented at different places in other application programs or in other types of data-processing systems.

Figure 3:
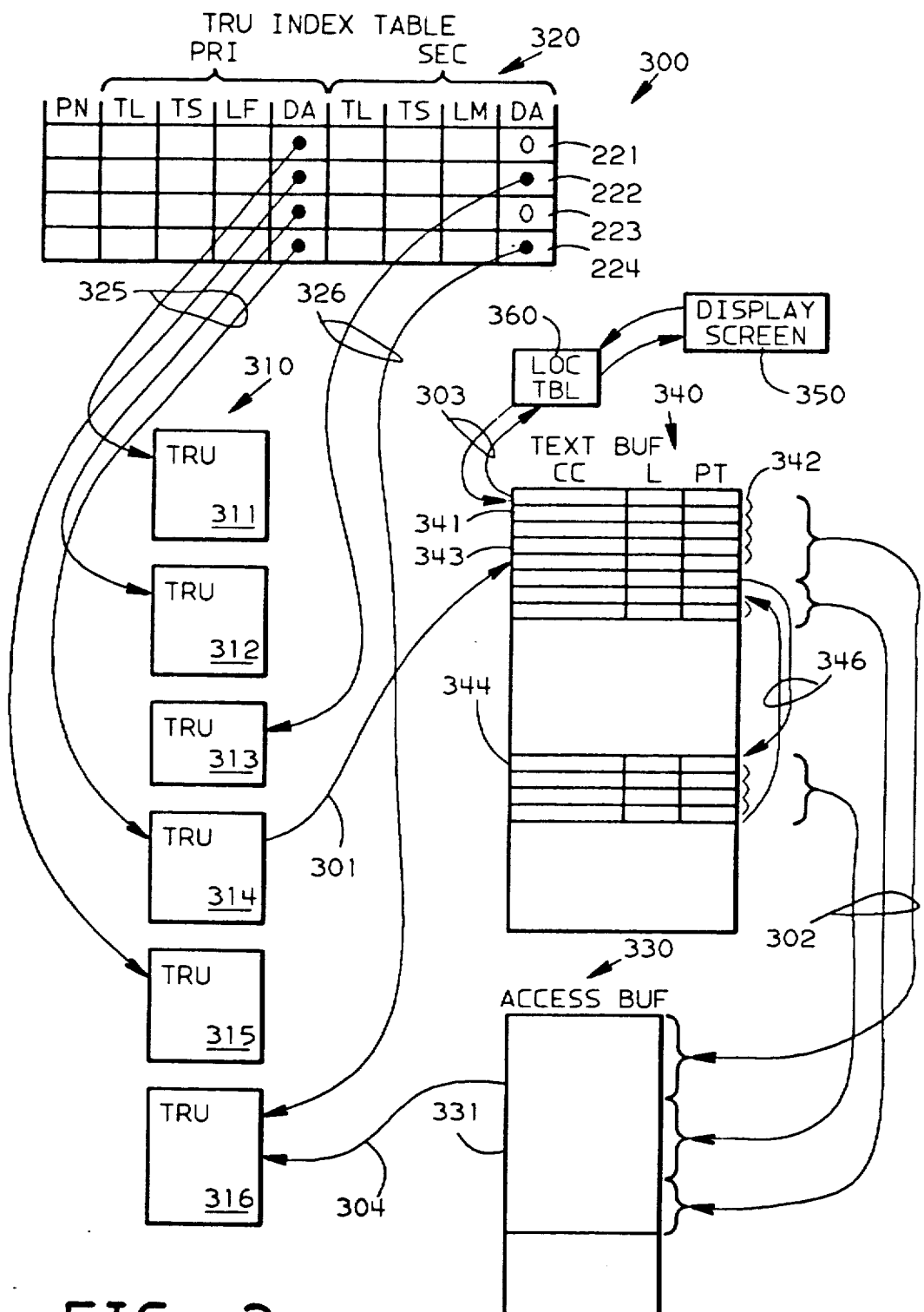
FIG. 3 describes the data structures used in the invention, and their interrelationships.

FIG. 3 shows the data structures 300 used in storing and accessing a data entity in the form of a text document. Document comprises a set of text record units (TRUs) 311-316, stored on disk or other convenient device. A TRU is usually about 2K (K = 1,024) bytes representing about 20-30 lines of text, but may range from a single line to several hundred text lines, depending upon the document format.

TRU index table 320 is located in main storage of the system, and is copied to disk whenever updated. It is an interface between the TRU storage locations known to the data-processing system and the document parameters known to word processor 100. Each table entry 321-324 can associate two TRUs with each other, one primary and one secondary. Each entry has nine fields.

PN: The document "Page Number" associated with the text in the TRU. This number is always the same for both the primary and the secondary TRU.
P/TL: The number of "Text Lines" of the document contained in the primary TRU. The number of characters in each line depends upon the document format specified by the user.
P/TS: The "TRU Size" of the primary TRU on disk storage. This is always a multiple of 256 bytes.
P/LF: The "Last Format" in the document. This specifies the document format in effect at the end of the text stored in the primary TRU.
P/DA: The logical "Disk Address" of the beginning of the text in the primary TRU. They are represented by arrows 325.
S/TL: The number of "Text Lines" in the secondary TRU for this table entry.
S/TS: The "TRU Size" of the secondary TRU on disk. The secondary TRU can be the same size as the primary, or either larger or smaller.
S/LF: The "Last Format" in effect at the end of the text in the secondary TRU.
S/DA: The "Disk Address" of the beginning of the text in the secondary TRU, as indicated by arrows 326. Entries such as 321 and 323 have no secondary TRUs, specified by placing a zero in this field.

The sequence of the entries in table 320 defines the sequence of the TRUs in the document. That is, the TRUs are linked together by following the entries 221-224 in sequence.

Access buffer 330 is a main-storage area for holding text 331 to be placed into a TRU after manipulation by the word processor. It may be about 4K to 6K bytes, enough to hold one or two TRUs at once, with about 2K bytes left for insertions. This buffer is controlled by a folder management system (FMS) of an access-method (AM) program in word processor 100, and might not be needed in other processor organizations.

Text Buffer 340 receives document text from TRUs 311-316 and sends it to access buffer 330, as indicated by arrows 301 and 302. It also exchanges text characters with display screen 350 in the user's terminal, arrows 303, under the control of read/write screen routine 206 of a conventional workstation management system (WMS) program. Location table 360 in main storage keeps track of which lines are currently being displayed, so they can be returned to the correct place in buffer 340. Text buffer 340 holds about 4K bytes of text.

Text enters buffer 340 from a TRU such as 314, as symbolized by arrow 301. Once in buffer 340, the text loses its identity as a TRU. Instead, it is organized only as a linked list of character lines. Each list item such as 341 in the text buffer contains the following fields.

PT: A pointer to the next entry in buffer 340, as symbolized by arrows 342.
L: The length of the line; that is, the number of bytes in the CC field which represent valid characters in the line.
CC: The character codes for one line of text in document 310. This field has a variable width.

Text is loaded into buffer 340 wherever space exists, and is coupled to any text already there by conventional manipulation of the pointers PT. If an entire line is deleted during the course of editing, its length L is set to zero. Additional list items such as 344 are created to hold inserted text; these are linked to the original items as shown at 346. When an edited text line still fits in its original CC field, it is replaced there, and the L field is changed if necessary to reflect its new length.

When buffer 340 gets too full, the text is reconstructed into a single block 331 in buffer 330. This happens when the end of the next line to be added exceeds the end address of the buffer. A conventional list-processing routine merely follows the chain of pointers 342, 344, 346 to transfer the lines in the correct order, as symbolized by arrows 302. Only the valid characters in each line are moved and successive lines are abutted. The access-method program then moves text 331 into a TRU 316, symbolized by arrow 304. In the example illustrated in FIG. 3, the original text moved into buffers 330 and 340 is a primary TRU 314, and the modified text moved out to document 100 is a secondary TRU 316. After finding disk space to store TRU 316, the access method therefore fills in the proper values for S/TL, S/TS, S/LF, and S/DA in index-table entry 324.

Figure 5:
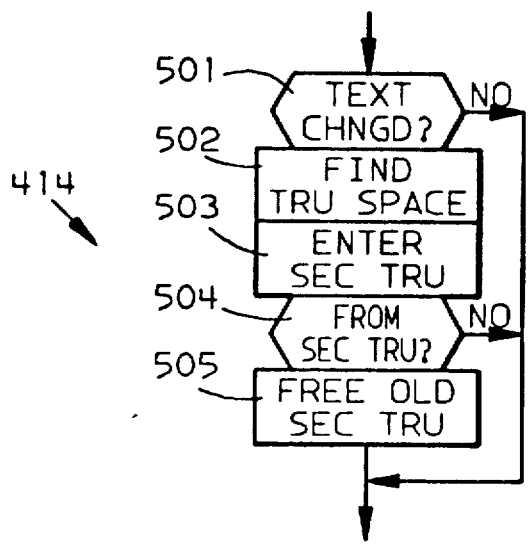
FIG. 5 shows the Put TRU function of FIG. 4.
Figure 6:
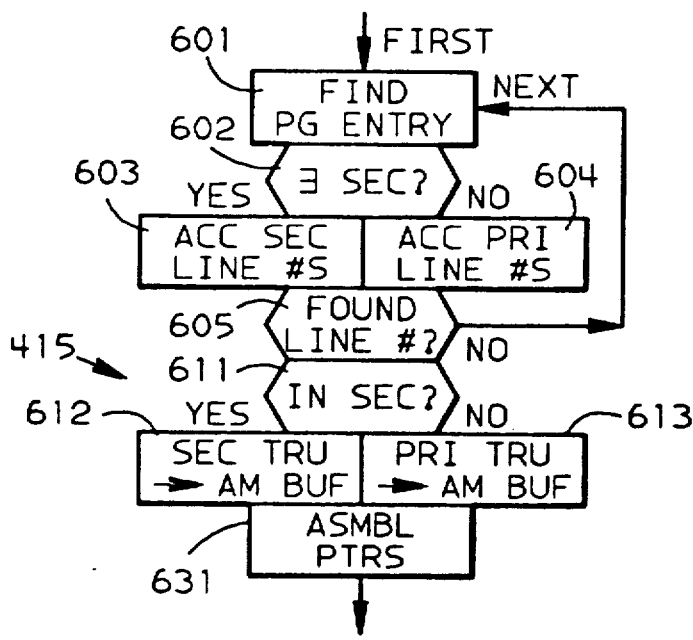
FIG. 6 shows the Get TRU function of FIG. 4.

FIGS. 4-6 show the sequence of steps in manipulating the data objects described in FIG. 3.

FIG. 4 is a flowchart of the read/write screen (RWS) operation 206, FIG. 2 of word processor 100. Conventional routines 401 and receive the operator's modifications by reading the current display screen 350 and placing it in list items in buffer 340, using location table 360. Block 403 sets or resets a "Changed Data" flag in an FMS control block, according to whether or not the user had modified any text on that screen. Block 404 then updates the pointers PT as described in connection with FIG. 3. If block 405 detects that the returning screen has more data than when it had been written to the screen, block 406 finds more free buffer space for the extra text, and block 407 rearranges the pointers to include it in the chain. This is the situation shown at 344 and 346, FIG. 3. During this latter process, block asks whether enough space remains in buffer 340; if not, blocks 414 and 415 store away the buffer contents in a TRU and get another one. (Blocks 414 and 415 are described below.)

The existence of TRUs is transparent to the operator; he merely selects (either explicitly or implicitly) a certain page/line location in the document to be displayed. Therefore, block 411 determines whether the new characters requested for screen 350 are within the range of document page/line numbers already located in text buffer 340. Block 412 determines whether buffer 340 is becoming full, or excessively fragmented. If the next screen is in the text buffer, and if the buffer has enough free space, block 413 writes the requested screen out to display 350 from text buffer 340. Otherwise, FMS puts the contents of the text buffer into a TRU (or into more than one TRU), in block 414, and gets one or more other TRUs from the document, in block 415. Buffer 340 now contains the desired screen, and block 413 then writes it to the display.

FIG. 5 details the Put TRU operation of block 414, FIG. 4. First, if no text has changed since the screen was displayed, then the old screen need not be stored back into buffer 340 at all. In that case, block 501 exits the put operation. Otherwise, block 502 finds disk space capable of holding a TRU for the modified text (such as 316), and writes the text to disk. The proper table entry is found by searching for the page number PN, then counting lines in the appropriate TL fields until the correct number is reached. Block 503 then fills in the fields S/TL, S/TS, S/LF, and S/DA for the index-table entry (such as 324). At this point, routine 414 has created a secondary TRU and placed its parameters in table 320 in the entry for the corresponding primary TRU. If the TRU had been a secondary TRU instead of a primary, its entries are merely overwritten with the new values. If the screen text had come from a secondary TRU, block 504 causes block 505 to free up the space occupied by the old secondary TRU for later use.

FIG. 6 details the Get TRU operation 415 of FIG. 4. Blocks 601-605 of the access-method routine FMS search the index table 320 to find which TRU contains the document page and line number for the new display. The page number is always in the PN field, so the FIRST iteration of block 601 finds the first entry for the desired page. If block 602 finds that a secondary TRU exists in that entry (S/DA nonzero), block 603 accumulates the number of text lines in the secondary TRU (S/TL); otherwise, block 604 accumulates the number of lines in the primary TRU (P/TL). If the line number of the desired line has not yet been reached, block 605 returns to the NEXT input of block 601, causing it to find the next entry for that page. When the line has been found (or the last line on the page is reached), block 611 determines whether the line is in a primary or a secondary TRU. If the latter, block 612 moves the TRU at disk address S/DA of the entry into text buffer 340; otherwise, block 613 moves in the TRU at P/DA for that entry. Block 612 or 613 moves the text line by line to the CC fields of text buffer 340. Block 621 then assembles pointers PT into a chain. The last pointer contains a reserved value indicating end of text. The L field of each line is contains the length in bytes of the CC+L+PT fields for that line.

At the end of an editing session, document 310 exists as a collection of primary and secondary TRUs 311-316, FIG. 3, representing both an old version (in the sequence 311, 315, 312, 314) and a new version (in the sequence 311, 313, 312, 316) of the document. It is now time to condense the document to a single version.

Figure 7:
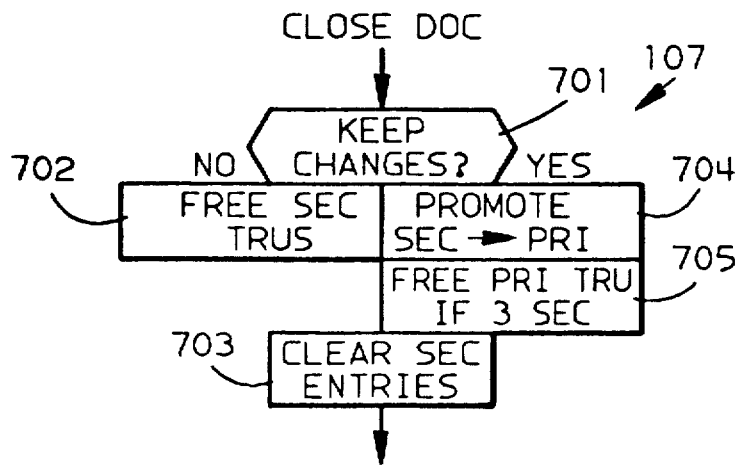
FIG. 7 illustrates the Close Document function of FIG. 1.

FIG. 7 describes the relevant part of the Close Document routine, block 107 of FIG. 1. When the user ends an edit task on a document, block 701 asks whether or not he wishes to keep the changes. If he selects not to keep them, the secondary TRUs (313, 316) are discarded. Block 702 reads through the S/DA fields of index table 320 and frees the disk space occupied by the secondary TRUs (313 and 316, FIG. 3). Block 703 then clears the secondary-TRU fields, S/TL, S/TS, S/LF, and S/DA, in all index-table entries 321-324. The example document 310 now consists of TRUs 311, 315, 312, and 314, and is exactly the same as when it was first opened.

If the user selects to keep the changes, however, block 704 substitutes the secondary TRUs for their associated primaries, by copying the S/TL, S/TS, S/LF, and S/DA fields of these entries into the corresponding primary fields of the same entries. Block 705 then reads through the P/DA fields of table 320 and frees the disk space occupied by the primary TRUs for which a secondary TRU exists (entries 322 and 324). Finally, block 703 clears all secondary fields for reuse in a later session. Document 310 now consists of TRUs 311, 313, 314, and 316, and incorporates all the changes made by the user.

Figure 8:
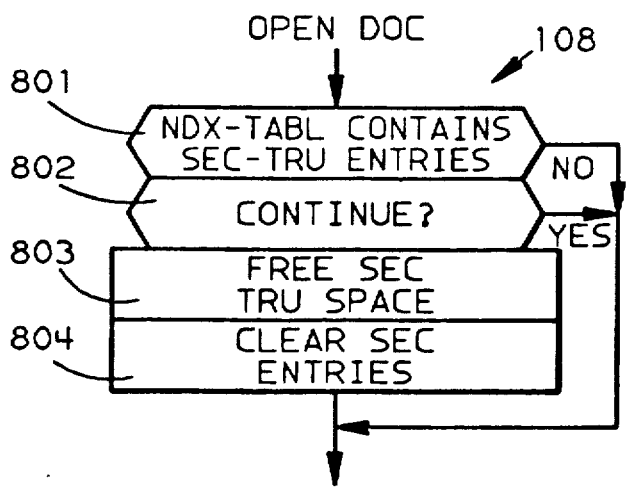
FIG. 8 illustrates the Open Document function of FIG. 1.

FIG. 8 shows the relevant part of the Open Document routine 107, FIG. 1. Sometimes accidents happen, and a document is left in a dyscratic state: a disk error, a power failure, etc. in the middle of an editing session. When the user tries to open any existing document, block 801 looks for non-zero secondary TRUs in its index table 320. If the document is in order, none will be found, and routine 107 exits to other conventional functions. If one or more secondary TRUs are found, block 802 asks the user what to do about it. If the user wishes to continue with the modified document, routine 107 again exits. But, if he decides to flush all the changes and start over, blocks 803 and 804 free the secondary TRU space and clear the secondary entries in the same manner as blocks 702 and 703, FIG. 7.

Having described a preferred embodiment thereof, we claim as our invention:

1. A computer implemented selecting among multiple versions of a data entity in a reduced amount of storage in a data-processing system having a terminal means for presenting data to an operator and for receiving data from said operator, comprising the steps, performed by a program residing in said data-processing system, of:
    (a) storing said data entity as multiple primary record units in said storage, each holding a portion of the data in said entity;
    (b) constructing in said storage an index means for linking said primary units in a sequence;
    (c) displaying particular data from one of said primary record units on said terminal means, said particular data being chosen by said operator;
    (d) receiving from said terminal means modifications to at least some of said particular data from said one primary record unit;
    (e) after step (d), creating a secondary record unit in said storage corresponding to said selected primary record unit and linked thereto by an index means;
    (f) storing said modified data in only said secondary record unit;
    (g) repeating steps (c)-(f) for further ones of said primary record units, so as to create further secondary record units in said storage;
    (h) thereafter, receiving an indication from said operator via said terminal means for selectively (1) substituting said secondary record units for those of said primary record units with which they are linked in said nedex means and discarding said corresponding primary record units, thereby discarding a first of said versions, and (2) discarding said secondary record units, thereby discarding a second of said versions.

2. Claim 1, comprising the further step of:
    (i) selectably clearing said secondary record units from said index means, thereby discarding a second of said versions.

3. Claim 1, wherein said index means is an index table having multiple entries, each entry including primary and secondary address fields for recording the locations in said storage of one of said primary and one of said secondary record units respectively.

4. Claim 1, comprising the further step of:
   (j) selecting a portion of said document contained in one of said secondary record units;
   (k) modifying at least some of the data in said selected secondary record unit;
   (l) storing said modified data from said secondary record unit as a further secondary record unit;
   (m) substituting said further secondary record unit for said selected secondary record unit in said index means.

5. Claim 1, wherein said data entity is a text document.

6. Claim 5, wherein said modifying step (d) comprises editing said data.

7. Claim 1, wherein said modifying step (d) includes:
   (d1) constructing a buffer having multiple items, each having a data field and a pointer field to another of said buffer items;
   (d2) moving data from said selected record unit into said buffer items.

8. Claim 7, wherein said modifying step (d) further includes:
   (d3) receiving additional data to be inserted into said buffer;
   (d4) constructing an additional item in said buffer;
   (d5) placing said additional data into an additional buffer item;
   (d6) readjusting said pointers so as to link said additional items to existing ones of said buffer items.

* * * * *